(12) United States Patent
Nagy et al.

(10) Patent No.: US 9,242,326 B2
(45) Date of Patent: Jan. 26, 2016

(54) TOOL CHANGE MAGAZINE FOR A MOTOR-DRIVEN MACHINE TOOL AND MACHINE TOOL

(75) Inventors: Attila Nagy, Miskolc-Szirma (HU); Hendrik Hesse, Steinenbronn (DE)

(73) Assignee: Robert Bosch GmbH, Stuttgart (DE)

( * ) Notice: Subject to any disclaimer, the term of this patent is extended or adjusted under 35 U.S.C. 154(b) by 537 days.

(21) Appl. No.: 13/614,109

(22) Filed: Sep. 13, 2012

(65) Prior Publication Data

US 2013/0244845 A1    Sep. 19, 2013

(30) Foreign Application Priority Data

Sep. 15, 2011  (DE) .......................... 10 2011 082 785

(51) Int. Cl.
| | |
|---|---|
| B23Q 3/157 | (2006.01) |
| B25F 1/04 | (2006.01) |
| B23F 5/02 | (2006.01) |
| F21V 33/00 | (2006.01) |
| B23Q 3/155 | (2006.01) |
| B25H 3/00 | (2006.01) |
| B25F 5/02 | (2006.01) |
| B23Q 17/24 | (2006.01) |

(52) U.S. Cl.
CPC ............ *B23Q 3/157* (2013.01); *B23Q 3/15526* (2013.01); *B23Q 3/15706* (2013.01); *B23Q 17/2442* (2013.01); *B25F 5/029* (2013.01); *B25H 3/003* (2013.01); *F21V 33/0084* (2013.01); *B23Q 3/15766* (2013.01); *B25F 1/04* (2013.01); *Y10T 483/14* (2015.01); *Y10T 483/1783* (2015.01); *Y10T 483/1798* (2013.01); *Y10T 483/18* (2015.01); *Y10T 483/1827* (2015.01); *Y10T 483/1882* (2015.01)

(58) Field of Classification Search
CPC .................. Y10T 483/1798; Y10T 483/1827; Y10T 483/179; Y10T 483/1779; Y10T 483/1783; Y10T 483/1767; Y10T 483/1769; Y10T 483/1771; Y10T 408/37; B23Q 3/15766
USPC ................. 483/57, 61, 54, 49, 51, 44, 45, 46; 408/35
See application file for complete search history.

(56) References Cited

U.S. PATENT DOCUMENTS

| | | | |
|---|---|---|---|
| 5,597,275 A | 1/1997 | Hogan | |
| 5,733,034 A | 3/1998 | Jan | |
| 5,797,670 A | 8/1998 | Snoke et al. | |
| 6,134,995 A * | 10/2000 | Shiao | .............................. 81/439 |
| 6,752,268 B1 | 6/2004 | Wadsworth | |

(Continued)

FOREIGN PATENT DOCUMENTS

| | | |
|---|---|---|
| DE | 85 15 168.1 U1 | 8/1986 |
| DE | 101 48 319 A1 | 4/2003 |

(Continued)

*Primary Examiner* — Erica E Cadugan
(74) *Attorney, Agent, or Firm* — Maginot, Moore & Beck LLP

(57) ABSTRACT

A tool change magazine for a motor-driven machine tool, in particular a handheld machine tool with a tool which is to be driven in rotation, has an annular or drum-shaped housing. The housing is rotatable about its longitudinal axis. The tool change magazine also includes tool chambers arranged within the housing and each configured to slidably receive a tool. The housing includes regions formed from a transparent material. The tool chambers are arranged in the housing at the regions formed from the transparent material.

11 Claims, 4 Drawing Sheets

(56) References Cited

U.S. PATENT DOCUMENTS 8,007,424 B2 * 8/2011 Moser et al. .................. 483/57
2006/0104732 A1 5/2006 Huang
2013/0032368 A1 * 2/2013 Zhang et al. .................. 173/1

FOREIGN PATENT DOCUMENTS

| DE | 20 2005 018 722 U1 | 4/2006 |
| DE | 10 2006 059 688 A1 | 6/2008 |
| WO | 2009/008711 A2 | 1/2009 |

* cited by examiner

TOOL CHANGE MAGAZINE FOR A MOTOR-DRIVEN MACHINE TOOL AND MACHINE TOOL

This application claims priority under 35 U.S.C. §119 to patent application no. DE 10 2011 082 785.4 filed on Sep. 15, 2011 in Germany, the disclosure of which is incorporated herein by reference in its entirety.

BACKGROUND

The disclosure relates to a tool change magazine for a motor-driven machine tool.

The disclosure also relates to a motor-driven machine tool.

A tool change magazine of said type as a constituent part in a machine tool, and a corresponding machine tool, are known from the Applicant's DE 10 2006 059 688 A1. The known tool change magazine has tool chambers in which in each case one tool is arranged. To enable an operator, during a tool change, to identify which tool is presently in use, and/or to permit the selection of the correct tool from the tool magazine, the known machine tool has, on the top side of its housing, a viewing window through which labels assigned for the identification of the tools in the individual tool chambers are visible. A problem here however is the visibility of the labels, for example under relatively dark environmental conditions. Here, the known machine tool basically requires the label to be arranged relatively close to the viewing window to allow as much light as possible to fall into the region of the label of the tool chamber, to allow said label to be seen as clearly as possible.

SUMMARY

Taking the discussed prior art as a starting point, it is the object of the disclosure to enable the tools situated in the tool chambers in a tool change magazine to be readily identifiable at all times, even under adverse environmental conditions, in particular for example under relatively dark environmental conditions. Said object is achieved in that the housing of the tool change magazine is composed at least in regions of a transparent material at least in the region of its tool chambers. In this way, it is possible for the tool situated in the tool chamber in each case to be easily identified from the outside, even without additional labelling.

In an optionally provided embodiment of the tool change magazine, in which clear labelling of the tool situated in the tool receptacle is permitted in addition to the facility for visual identification, it is proposed that a label for the tool is provided in the region of the respective tool chamber of the housing of the tool change magazine.

In a particularly preferred embodiment of the tool change magazine which permits firstly an optimization of the identification of the tool situated in the tool receptacle and secondly the adjustment of the tool change magazine into a handover or transfer position in the machine tool, it is proposed that the housing part which is composed of the non-transparent plastics material be a manually operable adjustment region configured to position a tool chamber into a handover or transfer position in the machine tool.

The disclosure also encompasses a motor-driven machine tool, in particular but not exclusively using a tool change magazine according to the disclosure. It is provided here that the region of the tool chamber is illuminated by a light source. The light source enables optimum identification of the label or of the tool chamber by an operator at all times even under adverse environmental conditions. Furthermore, when a label is used, the geometric arrangement with regard to the distance from the viewing window is less critical than in the prior art, because the label is for example also arrangeable at a relatively great distance from the viewing window, without the risk of such a label, which is relatively remote from the viewing window, being unidentifiable to the operator.

For the light source, it is preferable to use at least one light-emitting diode. A light source of said type requires a relatively small amount of space, is inexpensive to implement and permits adequately intense illumination of the tool chamber and/or of the label.

The costs of providing the light-emitting diode are further reduced when the at least one light-emitting diode is arranged on a printed circuit board which bears an electrical circuit. In practice, said electrical circuit is the electrical circuit which is simultaneously configured to detect the state of charge of a battery of the machine tool and for example signal an empty battery to the operator with a corresponding lamp. Accordingly, the at least one light-emitting diode necessitates only a relatively small amount of additional outlay for the printed circuit board and for the corresponding conductor paths to activate the light-emitting diode.

In a further, very particularly preferably provided variant of the machine tool, it is provided that the power supply of the at least one light-emitting diode is switched at least indirectly by an actuation element which is simultaneously configured to actuate the tool change magazine. This enables a particularly simple and inexpensive facility for the actuation of or power supply to the light-emitting diode.

In a particularly preferred variant of the latter embodiment, the power supply of the at least one light-emitting diode is activated only during a tool change. This has the advantage that the operator sees the corresponding label only during the relevant situation of the tool change, such that said label is illuminated particularly intensely, whereas during operation of the machine tool, due to the lack of illumination of the label, this does not pose a distraction to the operator as he works with the machine tool.

In a further embodiment, the viewing window is composed of plastic and exhibits a lens function. Such a lens function permits enlargement of the label or of the tool chamber and thus improved visibility, in particular when the tool chamber or label is arranged at a relatively great distance from the viewing window.

To attain optimum legibility or identifiability of the tool chamber or of the label at all times over the entire service life of the machine tool, the viewing window is arranged in a cutout in the housing, wherein a region, which is configured to enable identification of the tool chamber or label, of the viewing window is arranged below the housing surface in the region of the cutout. Said protected arrangement of the viewing window in particular prevents mechanical damage to the viewing window, in particular scratches or the like, such as arise during everyday operation of the machine tool, such that optimum identifiability is permitted at all times.

BRIEF DESCRIPTION OF THE DRAWINGS

Further advantages, features and details of the disclosure will emerge from the following description of preferred exemplary embodiments and on the basis of the drawing, in which.

Identical components or components of identical function are denoted by the same reference numerals in the figures.

DETAILED DESCRIPTION

Figure 1:
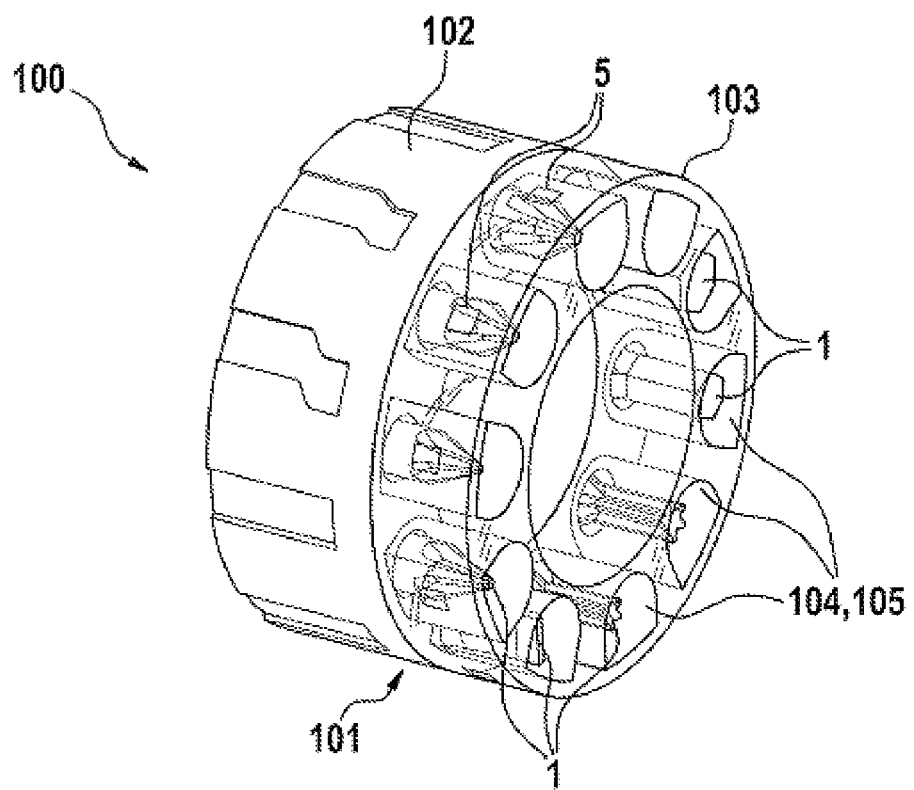
FIG. 1 shows a tool change magazine configured to be used in a machine tool, in a perspective view.

FIG. 1 illustrates a tool change magazine 100. The tool change magazine 100 has an annular or drum-shaped housing 101 which is rotatable about its longitudinal axis and which is divided in two in the longitudinal direction. A first housing part 102 is composed of a non-transparent plastics material, whereas a second housing part 103 which adjoins the first housing part 102 in the longitudinal direction is formed from transparent plastic. The first housing part is configured to enable manual adjustment of the tool change magazine in a machine tool 10, and for example is provided with corrugations or the like in order to permit simple and precise adjustment of the tool change magazine 100 by a user. Furthermore, scratches or the like are externally not as conspicuous on the housing part 102 composed of non-transparent plastic as on the housing part 103.

Within the housing 101 receptacles 104 are arranged at uniform angular intervals with respect to one another and are configured to receive in each case one tool 1. The receptacles 104 are formed such that the tools 1 are pushed out of or inserted into the respective receptacle 104 by a pin-shaped element. The receptacles 104 have for example corresponding openings or passages at their two mutually opposite end sides to accommodate the pin-shaped element. In particular, the tools 1 are so-called BIT tools 1, that is to say they have different tool tips configured to screw in or unscrew different fastening elements, in particular different screws. The second, transparent housing part 103 is arranged in that region of the tools 1 in which the tips of the tools 1 are also situated. This makes it possible for an operator to identify from the outside what tool 1 is situated in the receptacle 104, because the tip of the tool 1 constitutes a characteristic feature for the tool 1.

The receptacles 104 form tool chambers 105 and additionally have in each case one label 5 (not illustrated in any more detail), for example a pictogram or lettering, which is accomplished for example by a black colour in the region of the second housing part 103 in the region of the tool chamber 105.

Figure 2:
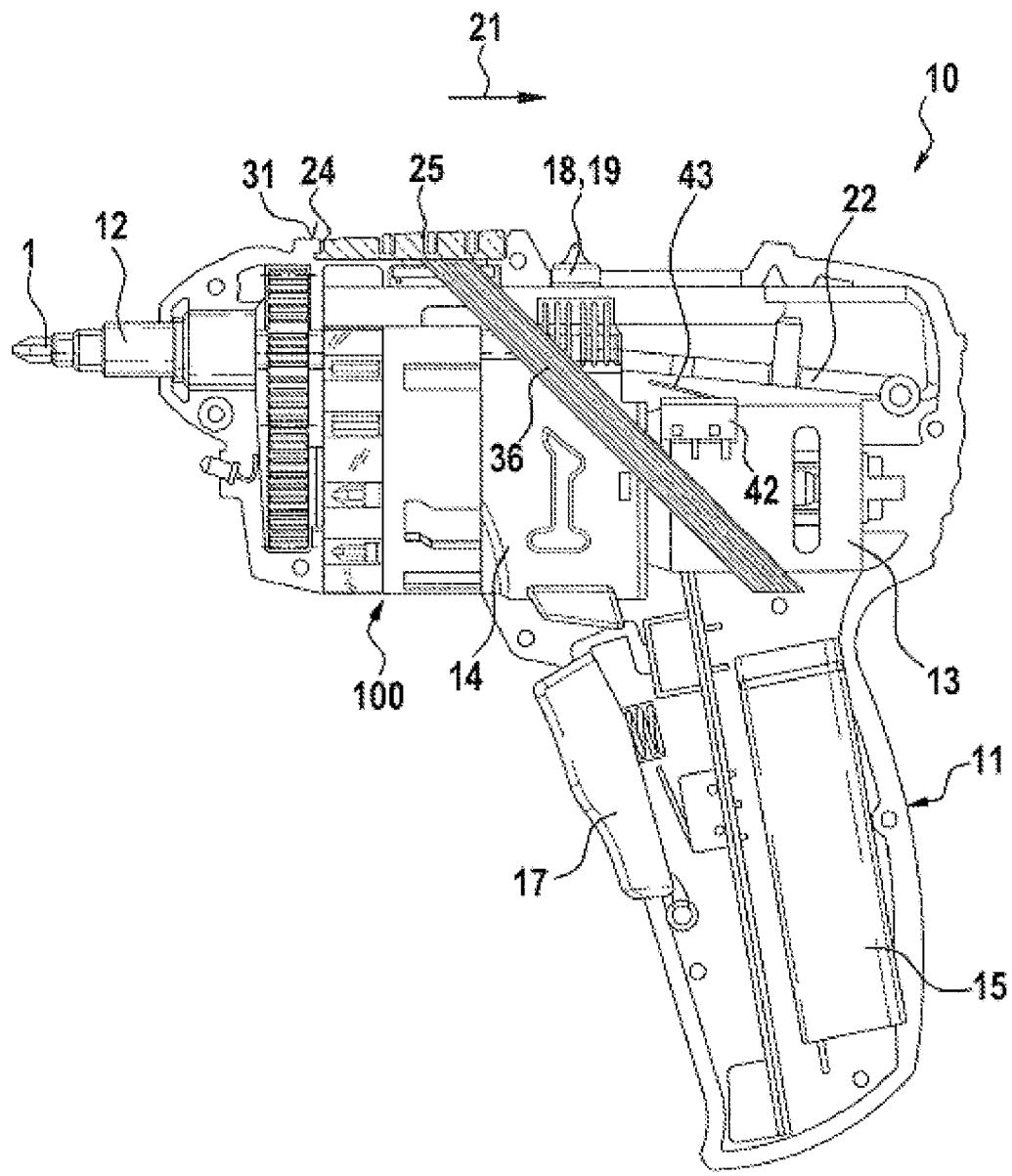
FIG. 2 shows a machine tool during normal operation, in longitudinal section.

FIG. 2 illustrates a machine tool 10 in the form of a motor-driven handheld machine tool. The machine tool 10 has a pistol-shaped housing 11 in which a tool receptacle 12 for the tools 1 of the tool chamber magazine 100 is arranged in a manner known per se. The tool receptacle 12 is driven by a drive motor which is an electric motor 13 and which acts on a gearing 14, which in turn drives the tool receptacle 12. The tool change magazine 100 is located between the gearing 14 and the tool receptacle 12 and is manually rotatable by an operator from the outside. The tool chambers 105 of the tool change magazine 100, which enable the exchange of a tool 1 into or out of the tool receptacle 12, are arranged in alignment with the longitudinal axis of the tool receptacle 12.

The drive motor 13 of the machine tool 10 is operated by a rechargeable power source 15 in the form of a battery and is actuated by an operating element 17. On the top side of the housing 11 there is arranged a positioning element 18 or actuation element in the form of an operating slide 19 which, in order to exchange a tool 1, is moved by an operator in the direction of the arrow 21 in order, via a tool change mechanism 22, to enable pushing the respectively desired tool 1 into the tool receptacle 12 or sliding a corresponding tool 1 back out of the tool receptacle 12 into the tool chamber 105. To enable selection of the corresponding tool 1 or the corresponding tool chamber 105, the tool change magazine 100 is rotated by the operator from the outside, by the first housing part 102 which is rotated manually by the operator, into the corresponding position aligned with the tool receptacle 12.

With regard to the precise mode of operation and the further, more detailed description of a previously described machine tool 10 of said type, reference is made by way of example to the Applicant's DE 10 2006 059 688 A1, which in this respect is to be regarded as a constituent part of this application.

Figure 5:
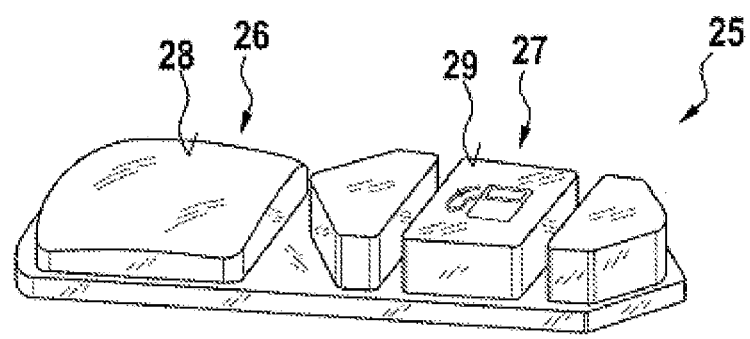
FIG. 5 shows, in a perspective illustration, a plastic insert for use as a viewing window in a machine tool as per FIGS. 2 and 3.

On its housing top side, the housing 11 has a cutout 24 configured to receive an in particular plastic viewing window 25, illustrated as a detail in FIG. 5. As per FIG. 5, the viewing window 25 has a first region 26 through which the operator identifies the tool chamber 105 which is interacting in each case with the tool receptacle 12, and if appropriate the additionally provided label 5, and therefore the respective tool 1. The first region 26 has a corresponding (domed) form which performs a lens function. That is to say a label 5 or the tool 1 which is seen through the first region 26 appears enlarged to the operator. Offset with respect to the first region 26 in the longitudinal direction, the viewing window 25 has a second region 27 which is configured to display the state of charge of the power source 15. In particular, in the event of a decrease in motor power or when a power source 15 is approaching an empty state, a corresponding illumination of the second region 27 instructs the operator to recharge the power source 15.

Figure 3:
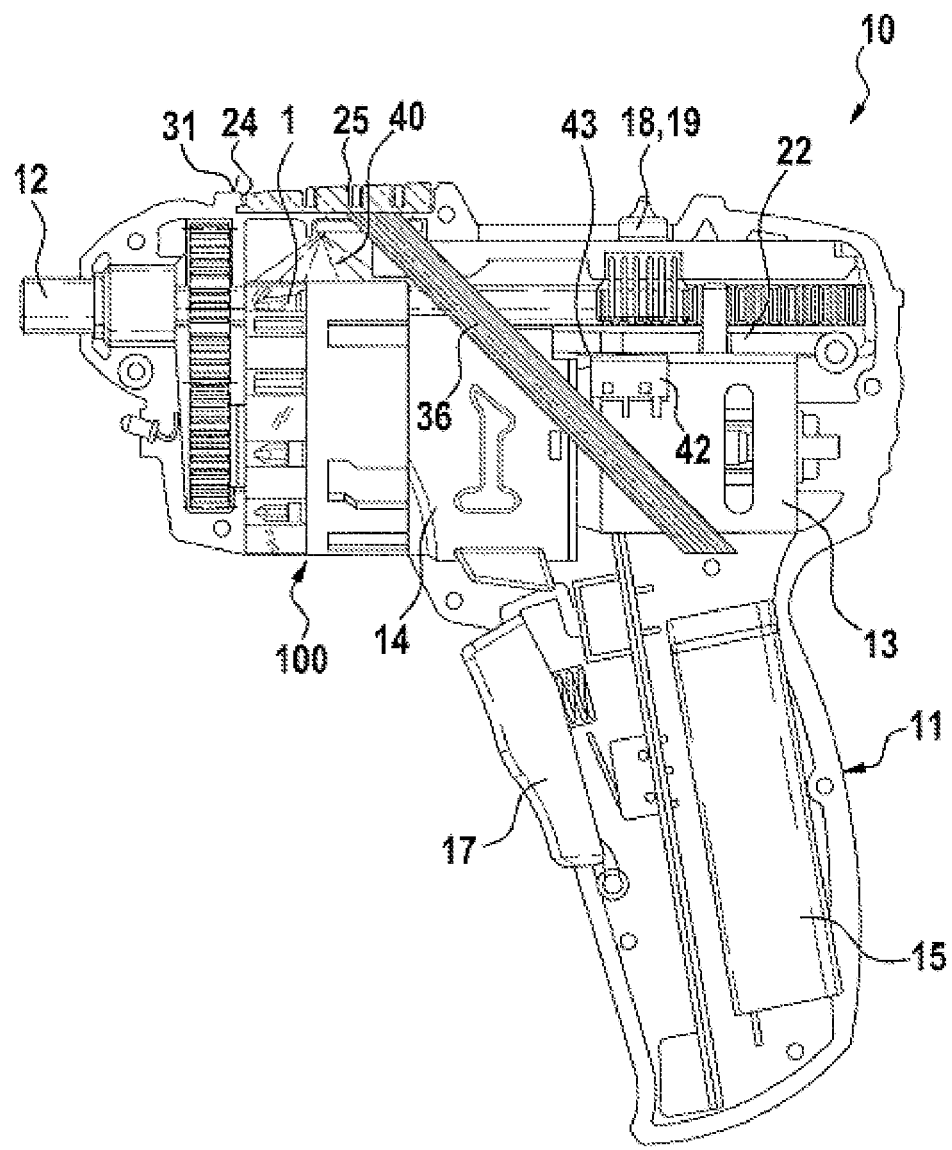
FIG. 3 shows the machine tool as per FIG. 2 during a tool change, likewise in longitudinal section.

It is furthermore seen from FIG. 5 that the top side 28 of the first region 26 is at a lower level than the top side 29 of the second region 27. As a result, the first region 26 is arranged in a sunken manner within the cutout 24, such that it is arranged in protected fashion below the housing surface 31 of the cutout 24 (FIGS. 2 and 3).

Figure 4:
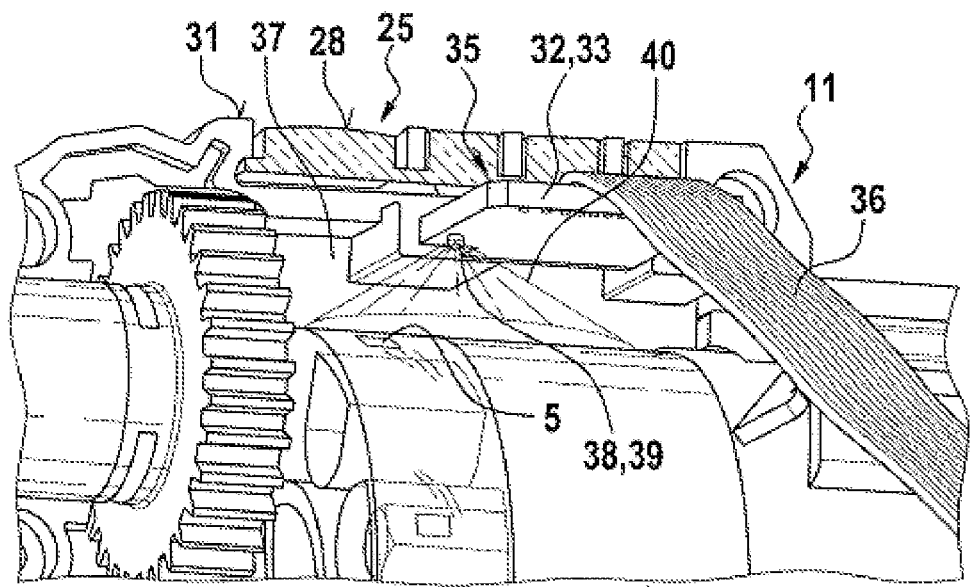
FIG. 4 shows a sectional, perspective view of the machine tool as per FIG. 3 in the region of a tool change magazine, in an enlarged illustration.

Below the second region 27 of the viewing window 25 there is arranged an electrical circuit carrier 32 in the form of a printed circuit board 33 (FIG. 4). The printed circuit board 33 bears an electrical or electronic circuit 35 and is at least indirectly connected at least to the power source 15 by a cable connection 36. The electrical circuit 35 is configured at least to detect the state of charge of the power source 15 and, if a certain state of charge is undershot or on the basis of other criteria, to signal this to the operator, by corresponding illumination of the second region 27 of the viewing window 25 as explained. Further, the direction of rotation of the electric motor 13 is detectable by the electrical circuit 35, and this is signalled to the operator by correspondingly illuminated parts of the second region 27 in the viewing window 25.

As is seen in particular from FIG. 4, the first region 26 of the viewing window 25 is arranged in alignment with the second, transparent housing part 103 of the housing 101, wherein between the first region 26 and the surface of the tool change magazine 100 there is formed a component-free channel 37 or an empty space.

This means that the label 5 arranged in the region of the corresponding tool chamber 105 or the transparent housing part 103 is identifiable by an operator from the outside through the first region 26 of the viewing window 25.

To allow the label 5 or the tool 1 situated in the tool chamber 105 to be identified by the operator in particular also under adverse lighting conditions, the region of the label 5 or of the housing part 103 is illuminated by a light source 38, in particular by at least one LED 39 (light-emitting diode). Here, the at least one LED 39 is preferably arranged, on the side facing the tool change magazine 100, on the underside of the printed circuit board 33 and emits a cone of light 40 which, via a corresponding free space to the channel 37, also covers or illuminates the label 5 or the tool chamber 105.

The at least one LED 39 is preferably supplied with power only while an operator performs a tool change. For this purpose, a switch 42 which is seen in FIGS. 2 and 3 and which has a movably arranged switch contact 43 in the form of a spring tongue is provided. The switch contact, during a corresponding actuation of the positioning slide 18, is pressed in the direction of the switch 42 and closes a corresponding power circuit for the supply of power to the at least one LED 39, as seen from a comparison of FIGS. 2 and 3. After the tool change, the positioning slide 18 is situated again in its position facing toward the tool receptacle 12, corresponding to FIG. 2, in which the switch contact 43 is open again such that the at least one LED 39 is switched into a deenergized state.

What is claimed is:

1. A tool change magazine comprising:
   an annular or drum-shaped housing rotatable about a longitudinal axis defined by the housing, the housing having at least one region formed from a transparent material; and
   at least one tool chamber arranged in the housing and located at the at least one region formed from the transparent material, the at least one tool chamber configured to slidably receive a tool,
   wherein the housing includes a first housing part and a second housing part that are adjoined such that the first and second housing parts are adjacent to one another along the longitudinal axis, the first housing part being formed from a non-transparent plastics material and the second housing part being formed from a transparent plastics material,
   wherein the tool is arranged within the at least one tool chamber such that a characteristic feature that identifies the tool is visible through a circumferential outer wall of the second housing part,
   wherein the first housing part is a manually operable adjustment region configured to position the at least one tool chamber into a transfer position in which the tool is configured to be moved from or into the at least one tool chamber, and
   wherein said non-transparent first housing part and said transparent second housing part are adjoined in a non-rotatable and fixed manner relative to one another.

2. The tool change magazine of claim 1, further comprising:
   a label corresponding to the tool, the label arranged at the at least one region.

3. The tool change magazine of claim 1, wherein said manually operable adjustment region is configured to position the at least one tool chamber into the transfer position via a manual rotation of the manually operable adjustment region.

4. A motor-driven machine tool comprising:
   a machine tool housing; and
   a tool change magazine accommodated at least partially within the machine tool housing, the tool change magazine comprising:
      an annular or drum-shaped housing rotatable about a longitudinal axis defined by the annular or drum-shaped housing, the annular or drum-shaped housing having at least one region formed from a transparent material; and
      at least one tool chamber arranged in the annular or drum-shaped housing and located at the at least one region, the at least one tool chamber configured to (i) slidably receive a tool, and (ii) adjust into a transfer position wherein in which the at least one tool chamber is aligned with a tool receptacle of the machine tool such that the tool is slidable within and between the at least one tool chamber and the tool receptacle; and
   the motor-driven machine tool further comprising:
      a viewing window configured to (i) illuminate with a light source from within the machine tool housing and (ii) permit visual verification of the presence of the tool in the at least one tool chamber in the transfer position, which at least one tool chamber in the transfer position is illuminated by the light source.

5. The machine tool of claim 4, wherein the light source comprises at least one light-emitting diode.

6. The machine tool of claim 5, wherein the at least one light-emitting diode is arranged in a free space in the machine tool housing, the free space located between the viewing window and the tool change magazine.

7. The machine tool of claim 5, wherein the at least one light-emitting diode is arranged on a printed circuit board which bears an electrical circuit.

8. The machine tool of claim 5, further comprising:
   an actuation element configured to be actuated to move the tool relative to the tool change magazine; and
   a power supply coupled to the at least one light-emitting diode and to the actuation element, the actuation element further configured to connect the power supply to the at least one light-emitting diode to supply power to the at least one light-emitting diode.

9. The machine tool of claim 8, wherein the power supply supplies power to the at least one light-emitting diode only when the actuation element is actuated.

10. The machine tool of claim 4, wherein the viewing window is formed from plastic and is configured to perform a lens function.

11. The machine tool of claim 10, wherein:
   the machine tool housing includes a housing surface and a cutout;
   the viewing window is arranged in the cutout; and
   the viewing window has a region configured to transmit the light from the light source therethrough so as to permit visual verification of the presence of the tool in the at least one tool chamber in the transfer position, the region of the viewing window being offset inwardly from the housing surface in a region of the cutout.

\* \* \* \* \*